United States Patent
Tetrick et al.

(10) Patent No.: US 8,433,854 B2
(45) Date of Patent: Apr. 30, 2013

(54) APPARATUS AND METHOD FOR CACHE UTILIZATION

(75) Inventors: R. Scott Tetrick, Portland, OR (US); Dale Juenemann, North Plains, OR (US); Jordan Howes, Davis, CA (US); Jeanna Matthews, Massena, NY (US); Steven Wells, El Dorado Hills, CA (US); Glenn Hinton, Portland, OR (US); Oscar Pinto, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 12/215,093

(22) Filed: Jun. 25, 2008

(65) Prior Publication Data

US 2009/0327607 A1 Dec. 31, 2009

(51) Int. Cl.
*G06F 12/00* (2006.01)

(52) U.S. Cl.
USPC ............................ 711/138; 711/118; 711/137

(58) Field of Classification Search .................. 711/118, 711/113, 133, 138
See application file for complete search history.

(56) References Cited

U.S. PATENT DOCUMENTS

| | | | |
|---|---|---|---|
| 6,578,111 B1 * | 6/2003 | Damron et al. | 711/133 |
| 6,748,487 B1 * | 6/2004 | Takamoto et al. | 711/113 |
| 7,360,015 B2 * | 4/2008 | Matthews et al. | 711/113 |
| 7,392,340 B1 * | 6/2008 | Dang et al. | 711/111 |
| 2002/0099971 A1 | 7/2002 | Merkin et al. | |
| 2004/0054860 A1 * | 3/2004 | Dixit et al. | 711/160 |
| 2004/0255106 A1 | 12/2004 | Rothman et al. | |
| 2004/0267708 A1 | 12/2004 | Rothman et al. | |
| 2005/0251630 A1 * | 11/2005 | Matthews et al. | 711/138 |
| 2007/0088915 A1 * | 4/2007 | Archambault et al. | 711/137 |
| 2008/0005524 A1 * | 1/2008 | Worrall | 711/171 |

FOREIGN PATENT DOCUMENTS

| | | |
|---|---|---|
| JP | 04-340637 A | 11/1992 |
| JP | 06195265 A | 7/1994 |
| JP | 0773107 A | 3/1995 |
| JP | 2000-003309 A | 1/2000 |
| JP | 2005149276 A | 6/2005 |
| WO | 2009/158183 A2 | 12/2009 |
| WO | 2009/158183 A3 | 2/2010 |

OTHER PUBLICATIONS

International Search Report and Written Opinion received for PCT Patent Application No. PCT/US2009/046731, mailed on Jan. 4, 2010, 10 pages.

(Continued)

*Primary Examiner* — Kaushikkumar Patel
(74) *Attorney, Agent, or Firm* — Jordan IP Law, LLC

(57) ABSTRACT

In some embodiments, an electronic system may include a cache located between a mass storage and a system memory, and code stored on the electronic system to prevent storage of stream data in the cache and to send the stream data directly between the system memory and the mass storage based on a comparison of first metadata of a first request for first information and pre-boot stream information stored in a previous boot context. Other embodiments are disclosed and claimed.

14 Claims, 8 Drawing Sheets

OTHER PUBLICATIONS

International Preliminary Report on Patentability received for PCT Patent Application No. PCT/US2009/046731, mailed on Jan. 13, 2011, 6 pages.

"Intel® NAND Flash Memory for Intel® Turbo Memory", White Paper Intel® Flash Memory, Copyright © 2007, 8 pages.

Office Action received for German Patent Application No. 112009000418.0., mailed on Apr. 6, 2011., 6 pages, including 3 pages of English translation.

Office Action received for United Kingdom Patent Application GB 1015976.2, mailed on Jan. 25, 2012, 3 Pages.

Japanese Office Action dated Oct. 9, 2012 in corresponding Japanese Patent Application No. 2010-547880, 4 pages (including two pages of English translation).

Office Action for related Chinese application. Patent application No. 200980112390.9, mailed Oct. 26, 2012, 21 pages including 13 pages of English translation.

Office action received for Japanese Patent Application No. 2010-547880, mailed on Jan. 22, 2013, 4 pages of Office Action including 2 pages of English translation.

* cited by examiner

APPARATUS AND METHOD FOR CACHE UTILIZATION

The invention relates to cache utilization. More particularly, some embodiments of the invention relate to an apparatus and method for utilizing a non-volatile cache in an electronic system such as a processor-based system.

BACKGROUND AND RELATED ART

Many electronic systems benefit from the use of cache memory. In some electronic systems, driver software may be provided to utilize cache memories.

U.S. Pat. No. 7,360,015 describes some utilizations of a cache memory which may include determining whether requested information is part of a streaming access, and directly transferring the requested information between a storage device and a memory if the requested information is part of the streaming access. Alternately, if the requested information is not part of the streaming access, it may be transferred between the storage device and a cache. In various embodiments, the cache may be a non-volatile disk cache.

In a white paper published at ftp://download.intel.com/design/flash/NAND/turbomemory/whitepaper.pdf, a white paper describes Intel® Turbo Memory as consisting of an Intel Turbo Memory controller ASIC (Application Specific Integrated Circuit) chip and two Intel NAND flash non-volatile memory components that enable faster resume to productivity after hibernate, providing additional power savings by limiting hard disk drive accesses and increasing application responsiveness for a richer user experience.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
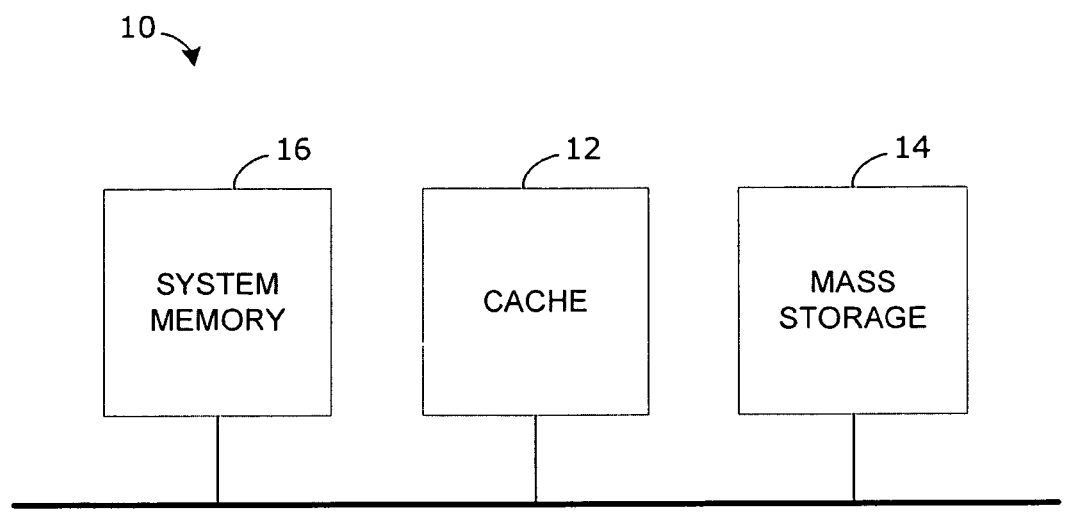
FIG. 1 is a block diagram of an electronic system in accordance with some embodiments of the invention.

With reference to FIG. 1, an electronic system 10 may include a cache 12 located between a mass storage 14 and a system memory 16. The system 10 may include code stored on the electronic system 10 to prevent storage of stream data in the cache 12 and to send the stream data directly between the system memory 16 and the mass storage 14 based on a comparison of first metadata of a first request for first information and pre-boot stream information stored in a previous boot context of the electronic system 10. For example, the code may be stored on the mass storage 14, the system memory 16, or another memory or storage device coupled to the electronic system 10.

In some embodiments of the system 10, the code may further cause the electronic system 10 to cache the first information if the first information is not determined to be part of a streaming access based on the comparison of first metadata associated with the first request and the pre-boot stream information. In some embodiments of the system 10, the code may further cause the electronic system 10 to receive a second request for mass storage access, the second request to request second information, and, if the first information has not previously been determined to be part of the streaming access, determine whether the second information is part of the streaming access based on a comparison of first metadata associated with the first request and second metadata associated with the second request, and if the second information is determined to be part of the streaming access, store stream information corresponding to the streaming access which is persistent across different power states of the electronic system including a hard boot of the electronic system 10, wherein the stored stream information can be later used as the pre-boot stream information for subsequent boots.

In some embodiments of the system 10, the code may further cause the system 10 to determine if the first information is part of a streaming access based on the comparison of first metadata associated with the first request and the pre-boot stream information, compare frequency information for the streaming access with a frequency threshold, perform the first request for mass storage access directly with the mass storage 14 if the first information is determined to be part of the streaming access and the frequency information for the streaming access does not exceed the frequency threshold, and cache the first information if the first information is determined to be part of the streaming access and the frequency information for the streaming access exceeds the frequency threshold. For example, in some embodiments the code may further update the frequency information for the streaming access. For example, in some embodiments the code may further compare length information for the streaming access with a stream length threshold, and prevent the storage of stream data in the cache and send the stream data directly between the system memory 16 and the mass storage 14 if the length information for the streaming access exceeds the length threshold.

Figure 2:
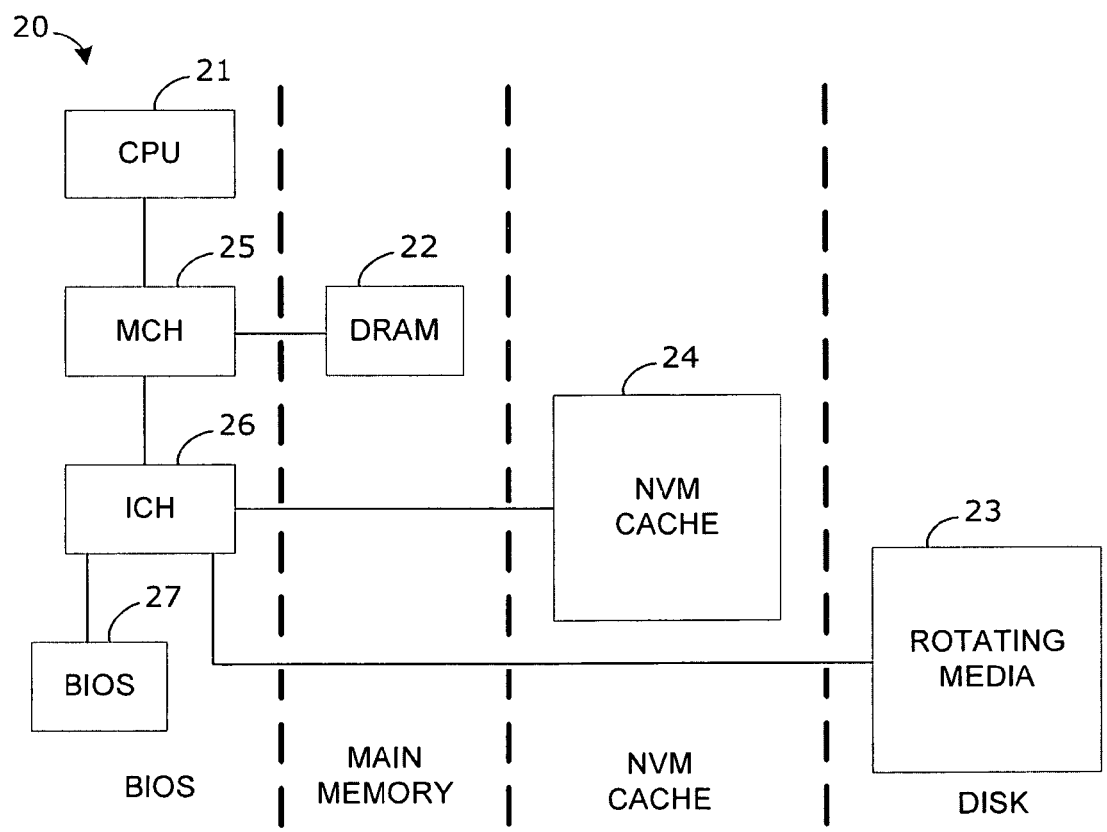
FIG. 2 is a block diagram of a processor-based system in accordance with some embodiments of the invention.

With reference to FIG. 2, a processor-based system 20 may include a processor 21, a system memory 22 coupled to the processor 21, a mass storage device 23, and a non-volatile cache memory 24 located between the system memory 22 and the mass storage device 23. For example, the processor 21 may be a central processing unit (CPU). For example, the system memory 22 may be a dynamic random access memory (DRAM). For example, the system memory 22 may be coupled to the processor 21 via a memory controller hub (MCH) 25. For example, the cache 24 may be a non-volatile memory (NVM) cache. For example, the mass storage device 23 may be a rotating media such as a hard disk drive or an optical disk drive. For example, the mass storage device 23 may be a non-rotating media such as a solid-state drive. For example, both the cache 24 and the mass storage device 23 may be coupled to the MCH via an input/output controller hub (ICH) 26.

Code stored on the processor-based system 20 may cause the processor-based system to receive a first request for mass storage access, the first request to request first information, retrieve pre-boot stream information stored during a previous boot context of the processor-based system, the previous boot context being other than a current boot context. The code may cause the processor-based system 20 to determine whether the first information is part of a streaming access based on a comparison of first metadata associated with the first request and the pre-boot stream information, and cache the first information if the first information is not determined be part of the streaming access based on the comparison of first metadata associated with the first request and the pre-boot stream information. If the first information is determined to be part of the streaming access, the code may cause the processor-based system 20 to compare frequency information for the streaming access with a frequency threshold, perform the first request for mass storage access directly with the mass storage device 23 if the first information is determined to be part of the streaming access and the frequency information for the streaming access does not exceed the frequency threshold, and cache the first information if the first information is determined to be part of the streaming access and the frequency information for the streaming access exceeds the frequency threshold. For example, the code may be stored on the mass storage device 23, the system memory 22, or another memory or storage device coupled to the processor-based system 20. For example, the code may be stored as part of a basic input/output system (BIOS) 27 coupled to the ICH 26.

For example, in some embodiments of the system 20 the code may further cause the processor-based system 20 to receive a second request for mass storage access, the second request to request second information. If the first information has not previously been determined to be part of the streaming access, the code may cause the processor-based system 20 to determine whether the second information is part of the streaming access based on a comparison of the first metadata associated with the first request and second metadata associated with the second request. If the second information is determined to be part of the streaming access, the code may cause the processor-based system 20 to store stream information corresponding to the streaming access which is persistent across different power states including a hard boot of the processor-based system 20, wherein the stream information can be later used as the pre-boot stream information for subsequent boots.

For example, in some embodiments of the processor-based system 20, the code may further update the frequency information for the streaming access. In some embodiments of the processor-based system 20, the code may further compare length information for the streaming access with a stream length threshold, and prevent the storage of stream data in the cache 24 and send the stream data directly between the system memory 22 and the mass storage device 23 if the length information for the streaming access exceeds the length threshold.

Figure 3:
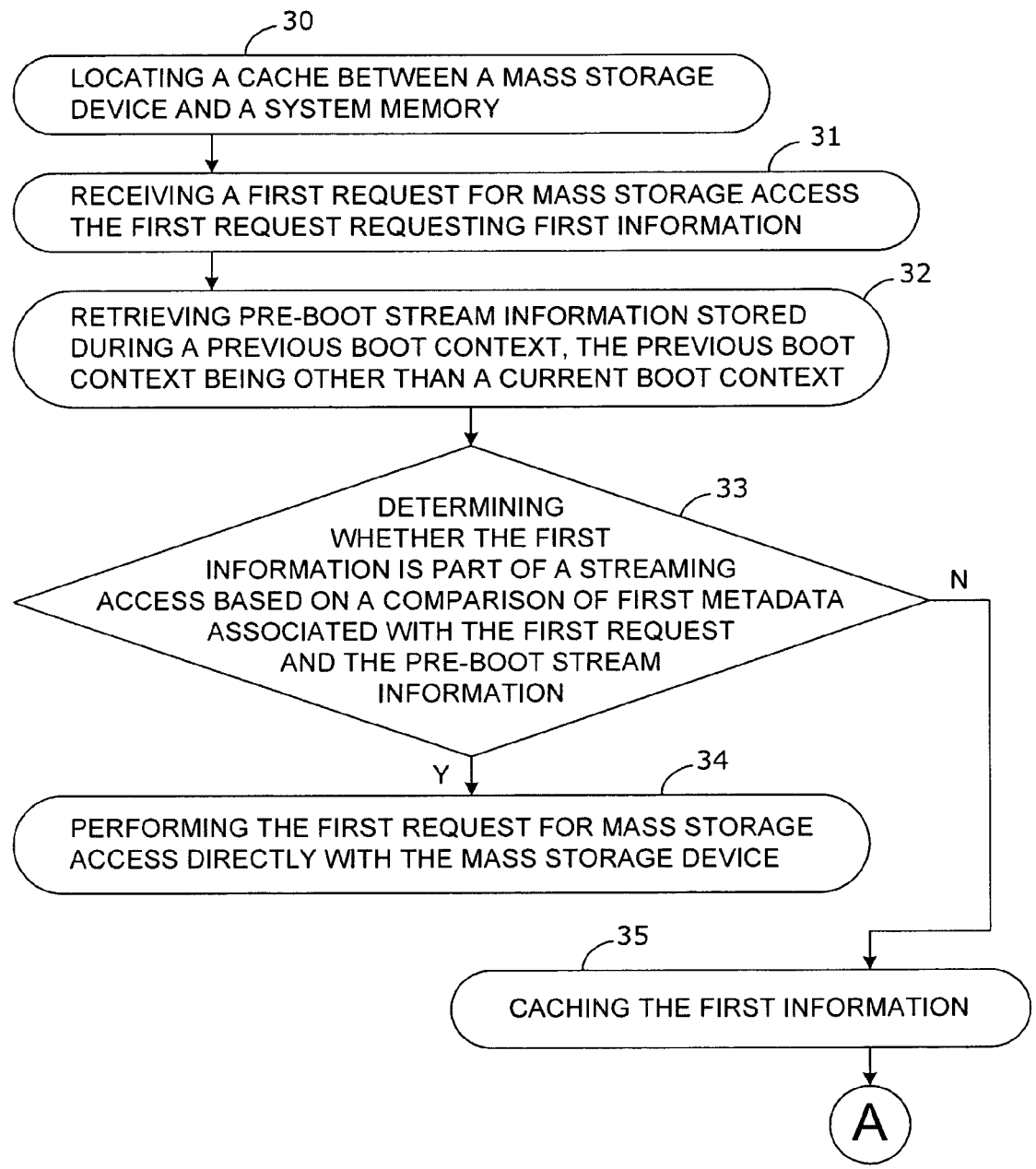
FIG. 3 is a flow diagram in accordance with some embodiments of the invention.
Figure 4:
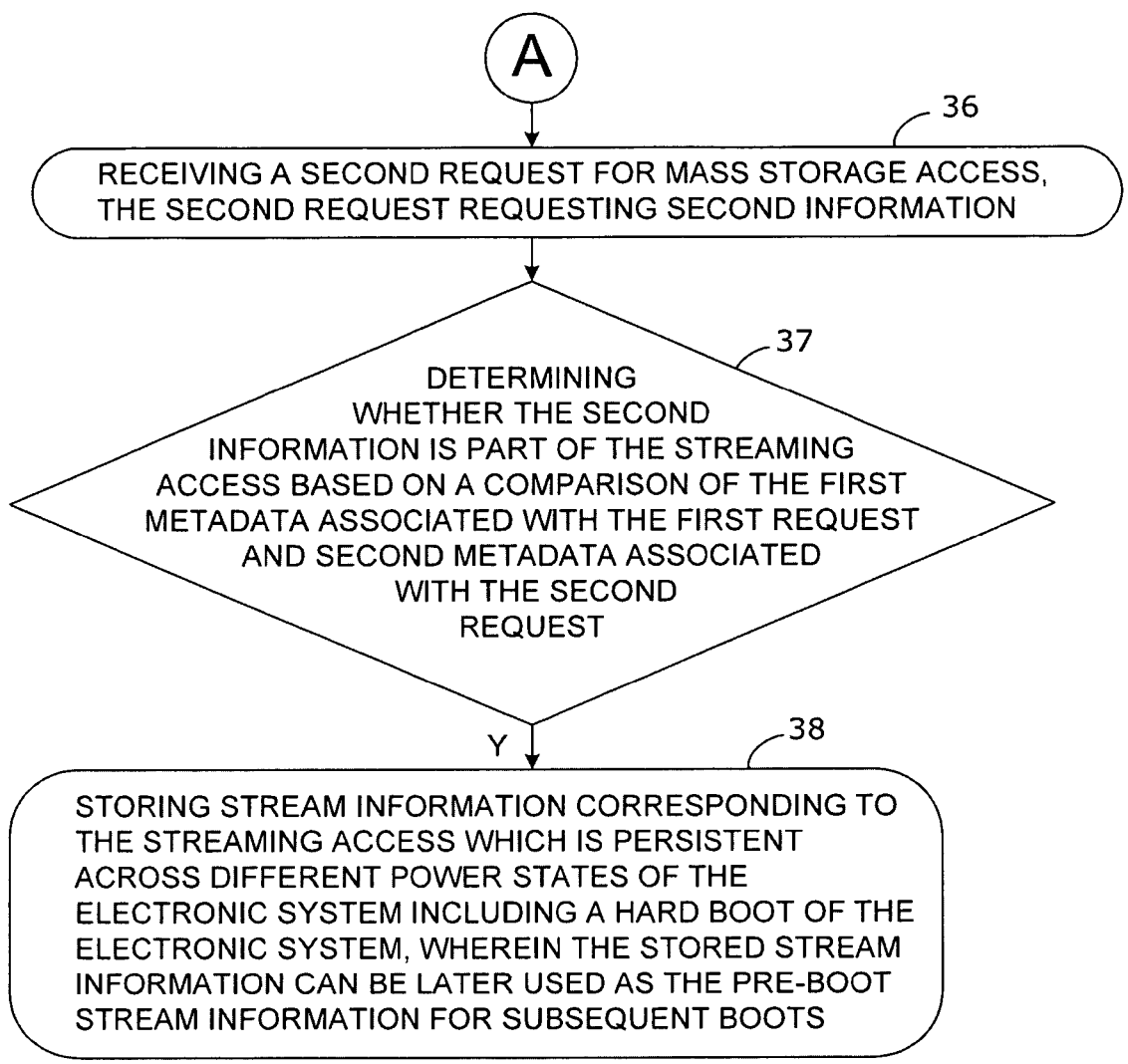
FIG. 4 is another flow diagram in accordance with some embodiments of the invention.

With reference to FIGS. 3 and 4, in accordance with some embodiments of the invention, utilizing a cache in an electronic system may include locating a cache between a mass storage device and a system memory (e.g. at block 30), receiving a first request for mass storage access, the first request requesting first information (e.g. at block 31), retrieving pre-boot stream information stored during a previous boot context, the previous boot context being other than a current boot context (e.g. at block 32), determining whether the first information is part of a streaming access based on a comparison of first metadata associated with the first request and the pre-boot stream information (e.g. at block 33), and performing the first request for mass storage access directly with the mass storage device (e.g. at block 34) if the first information is determined to be part of the streaming access based on the comparison of the first metadata associated with the first request and the pre-boot stream information.

For example, some embodiments of the invention may further include caching the first information (e.g. at block 35) if the first information is not determined to be part of the streaming access based on the comparison of the first metadata associated with the first request and the pre-boot stream information. For example, some embodiments of the invention may further include receiving a second request for mass storage access, the second request requesting second information (e.g. at block 36), and, if the first information has not previously been determined to be part of the streaming access, determining whether the second information is part of the streaming access based on a comparison of the first metadata associated with the first request and second metadata associated with the second request (e.g. at block 37), and, if the second information is determined to be part of the streaming access, storing stream information corresponding to the streaming access which is persistent across different power states of the electronic system including a hard boot of the electronic system, wherein the stored stream information can be later used as the pre-boot stream information for subsequent boots (e.g. at block 38).

Figure 5:
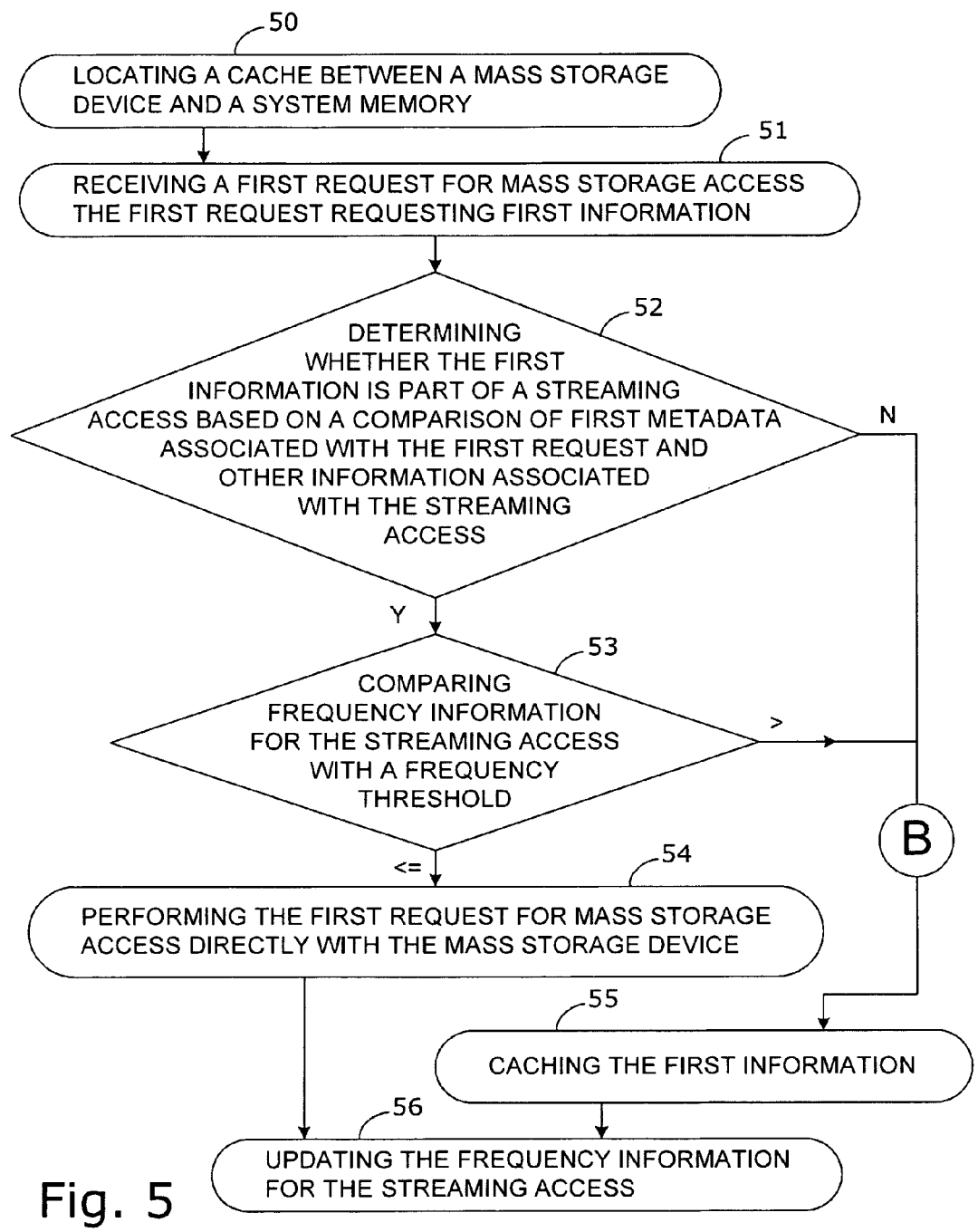
FIG. 5 is another flow diagram in accordance with some embodiments of the invention.
Figure 6:
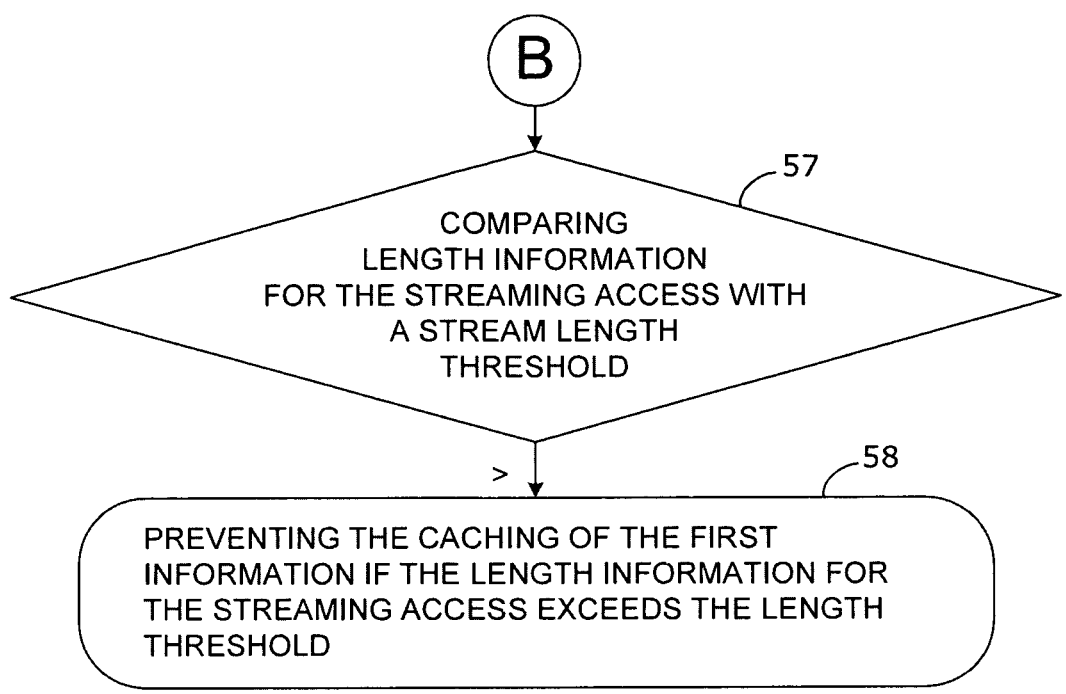
FIG. 6 is another flow diagram in accordance with some embodiments of the invention.

With reference to FIGS. 5 and 6, in accordance with some embodiments of the invention, utilizing a cache in an electronic system may include locating a cache between a mass storage device and a system memory (e.g. at block 50), receiving a first request for mass storage access, the first request requesting first information (e.g. at block 51), determining whether the first information is part of a streaming access based on a comparison of first metadata associated with the first request and other information associated with the streaming access (e.g. at block 52), and, if the first information is determined to be part of the streaming access based on the comparison of the first metadata associated with the first request and the other information associated with the streaming access, comparing frequency information for the streaming access with a frequency threshold (e.g. at block 53), performing the first request for mass storage access directly with the mass storage device (e.g. at block 54), if the first information is determined to be part of the streaming access and the frequency information for the streaming access does not exceed the frequency threshold, and caching the first information (e.g. at block 55), if the first information is determined to be part of the streaming access and the frequency information for the streaming access exceeds the frequency threshold.

For example, the other stream information associated with the streaming access may be pre-boot stream information, stream information saved in the current boot context, or other information associated with the streaming access which can be used to identify the first information as part of the streaming access. For example, some embodiments may further include updating the frequency information for the streaming access (e.g. at block 56). For example, some embodiments may further include comparing length information for the streaming access with a stream length threshold (e.g. at block 57), and preventing the caching of the first information if the length information for the streaming access exceeds the length threshold (e.g. at block 58).

Figure 7:
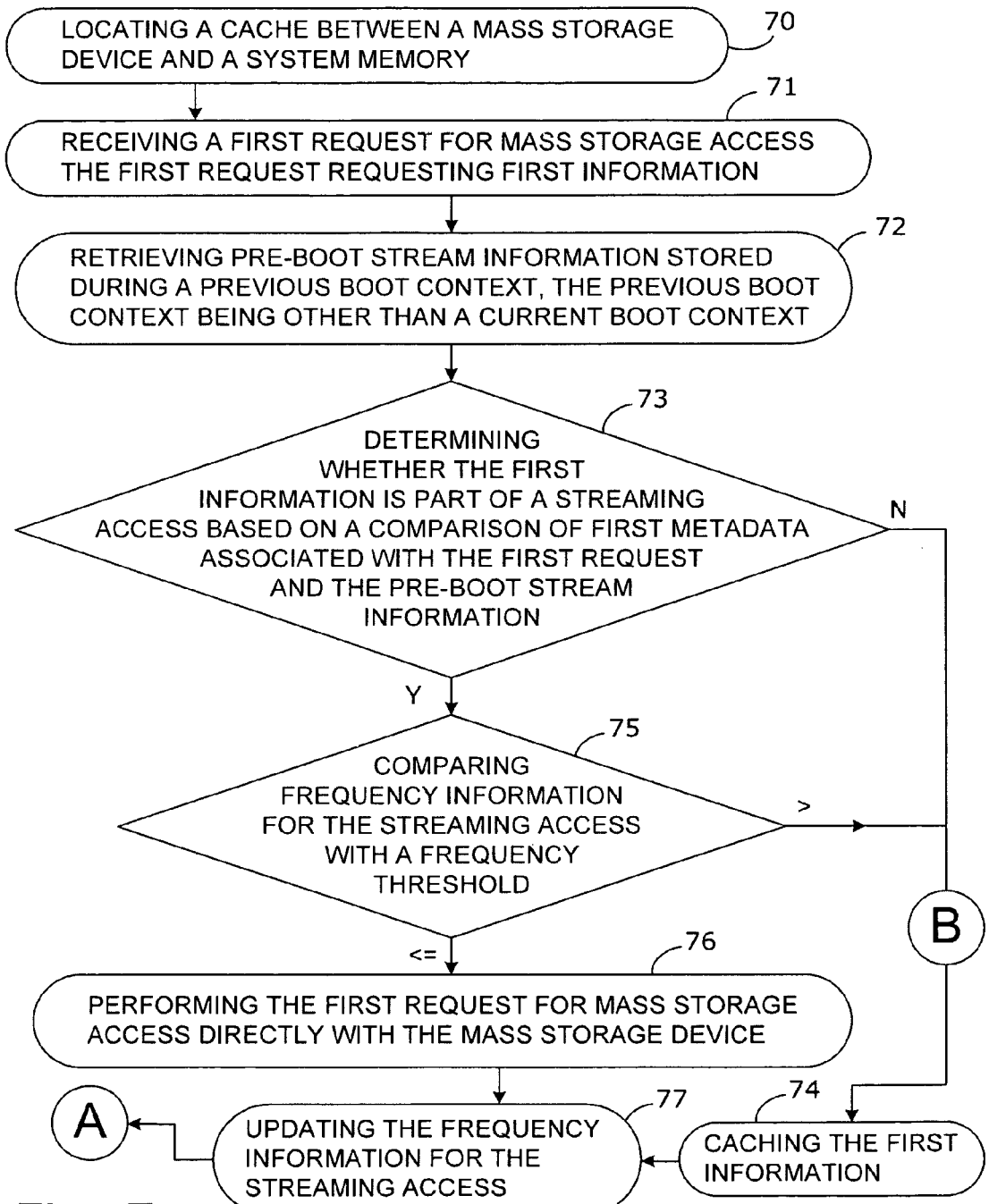
FIG. 7 is another flow diagram in accordance with some embodiments of the invention.

With reference to FIG. 7, in accordance with some embodiments of the invention, utilizing a cache in a processor-based system may include locating a cache between a mass storage device and a system memory (e.g. at block 70), receiving a first request for mass storage access, the first request requesting first information (e.g. at block 71), retrieving pre-boot stream information stored during a previous boot context, the previous boot context being other than a current boot context (e.g. at block 72), determining whether the first information is part of a streaming access based on a comparison of first metadata associated with the first request and the pre-boot stream information (e.g. at block 73), and caching the first information (e.g. at block 74) if the first information is not determined be part of the streaming access based on the comparison of the first metadata associated with the first request and the pre-boot stream information. If the first information is determined to be part of the streaming access based on the comparison of the first metadata associated with the first request and the pre-boot stream information, some embodiments may further include comparing frequency information for the streaming access with a frequency threshold (e.g. at block 75), performing the first request for mass storage access directly with the mass storage device (e.g. at block 76) if the first information is determined to be part of the streaming access and the frequency information for the streaming access does not exceed the frequency threshold, and caching the first information (e.g. at block 77) if the first information is determined to be part of the streaming access and the frequency information for the streaming access exceeds the frequency threshold.

Some embodiments of the invention may further include updating the frequency information for the streaming access (e.g. at block 78). For example, some embodiments may further utilize the cache following entry point A (e.g. see FIG. 3). For example, some embodiments may further utilize the cache following entry point B (e.g. see FIG. 5).

Advantageously, some embodiments of the invention may provide improved techniques for handling stream accesses between rotating media and a cache. As described in the above-noted white paper, Intel Turbo Memory provides a cache strategy which may speed hard disk accesses. However, there are some accesses that the hard disk does well, and at the same time, may be detrimental to the cache. For example, media file playback demands can readily be satisfied by the hard disk at the rates required for HD video display. Because such files are large and rarely reused, they violate a fundamental premise of caching, namely temporal locality. If these files were cached, the impact would be that locations with good temporal locality may be evicted from the cache to be replaced with those with bad temporal locality. Advantageously, some embodiments of the invention may improve the timing and quality of the decision of when and whether to cache information.

The decision process may be complicated by the location of the cache driver software in the file system software stack. For example, the cache driver software may not directly have access to file name information. Instead, the cache driver software may have access to limited information such as the following metadata:

LBA—Logical block address used to identify the starting sector on the hard drive;
Command—Command to the mass storage device, e.g. a read or write; and
Length—The number of sectors for the command.

Advantageously, some embodiments of the invention may provide improved techniques to assemble and utilize this limited information available to the cache driver software to identify and manage streams. For example, a stream may be a set of commands that represent the same command, and all or almost all of the sectors. For example, in some embodiments, a minimum size may be a useful parameter to detect and identify streams. The minimum size parameter may have the effect of making the cache seem larger, because unlikely candidates may be removed.

Figure 8:
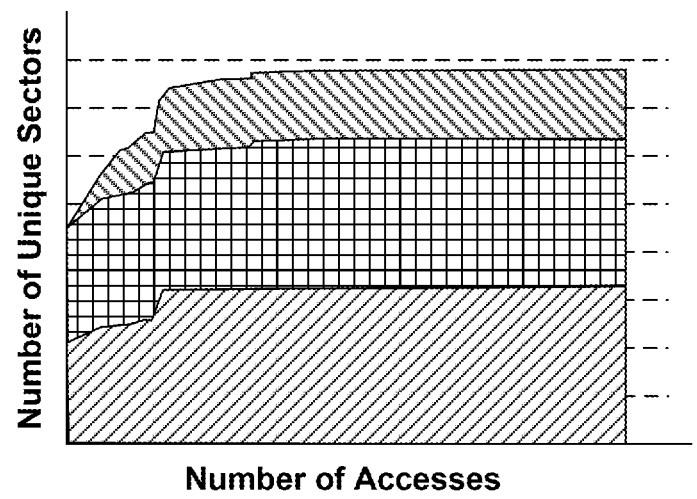
FIG. 8 is a graph of number unique sectors versus number of accesses for comparison with some embodiments of the invention.
Figure 9:
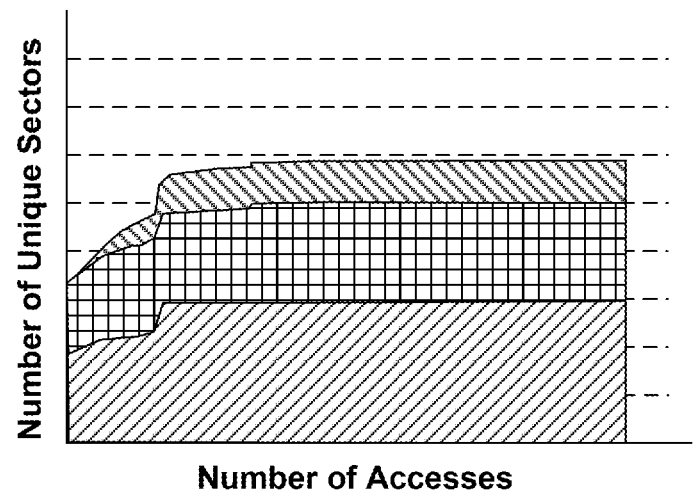
FIG. 9 is a graph of number unique sectors versus number of accesses in accordance with some embodiments of the invention.

With reference to FIGS. 8 and 9, FIG. 8 shows an example simulated cache utilization without the minimum size parameter while FIG. 9 shows an example simulated cache utilization with a four megabyte (MB) minimum size parameter. As can be seen in FIG. 9, about 40% of the cache size was made available after the 4 MB or greater sized streams were removed.

In some embodiments information regarding the stream may be stored in metadata. Such information may be used to later identify the same stream, if later requested for access. Such metadata may be used to directly access the data for this later request from, for example, a disk drive and forego storage in the cache. In some embodiments, a streaming access may be detected and identified by recording information regarding prior accesses into an array of potential stream information. Such an array may be stored in various locations, such as system memory or in the cache itself, for example. Each element in this array may include certain metadata, such as a starting location (e.g., starting disk address), a length, a count of the number of requests in the stream (or potential stream) and/or a timestamp indicating the arrival of the latest request in the stream (or potential stream). For example, after the stream is completed, the final length of the stream may be denoted in metadata.

Figure 10:
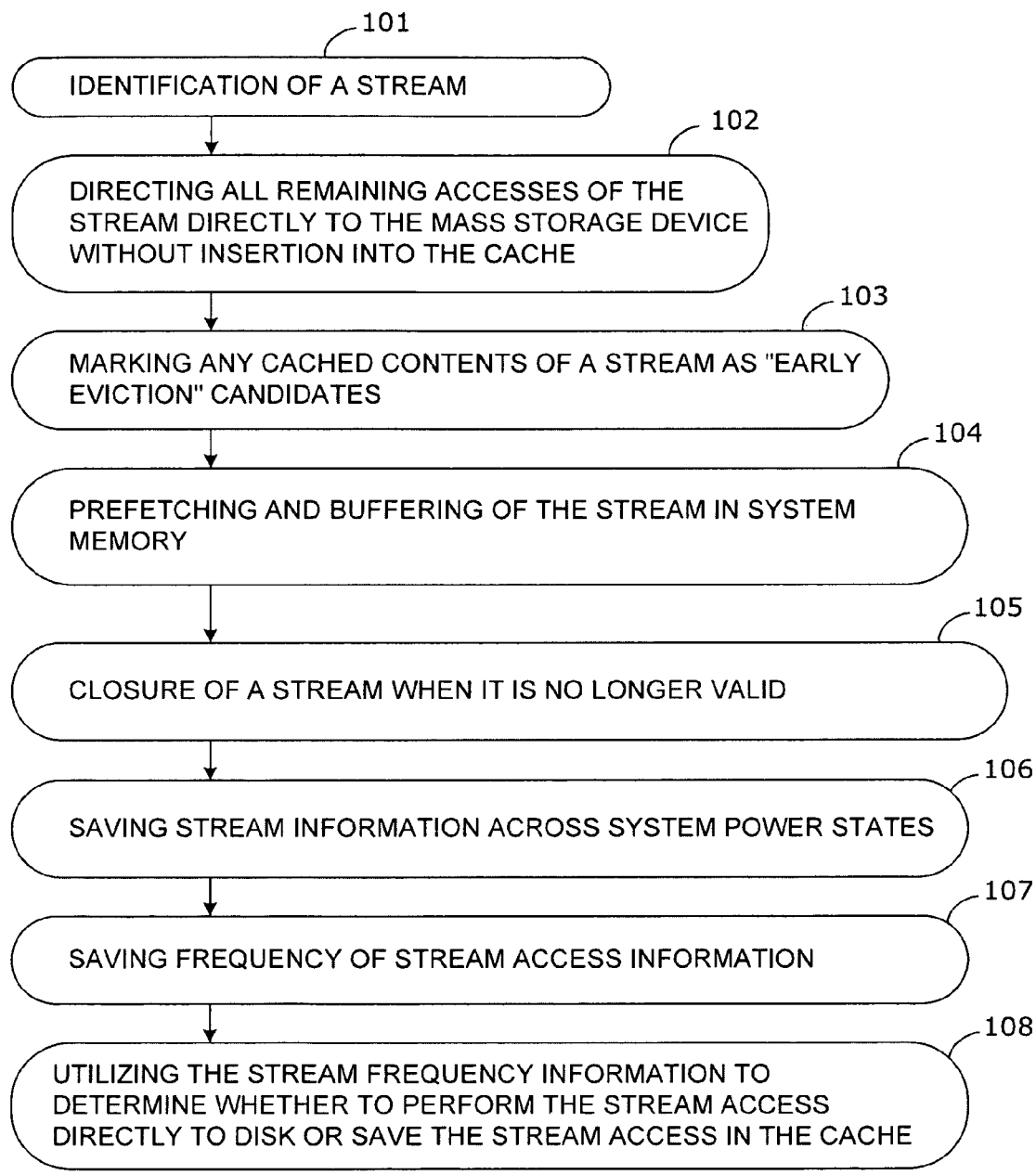
FIG. 10 is another flow diagram in accordance with some embodiments of the invention.

With reference to FIG. 10, some embodiments of the invention may include identification of a stream (e.g. block 101). For example, this identification includes sequential accesses, but is not limited to only sequential accesses. For example, if the information is close enough to sequential, the access may also be detected as a stream. Both read accesses and write accesses may be identified as streams. Advantageously, by not limiting stream identification to sequential accesses, some embodiments of the invention may identify two additional cases:

a) when the stream is not accessed sequentially; and
b) when the stream is not arranged sequentially on the mass storage device (e.g. a rotating media) due to, for example, fragmentation or compression (but not limited to these examples).

Some embodiments of the invention may further include directing all remaining accesses of the stream directly to the mass storage device (e.g. hard drive) without insertion into the cache (e.g. block 102), marking any cached contents of a stream as "early eviction" candidates (e.g. block 103), prefetching and buffering of the stream in system memory (e.g. DRAM) (e.g. block 104), and closure of a stream when it is no longer valid (e.g. block 105), for example, due to reuse or time based aging.

Some embodiments of the invention may further include saving stream information across system power states (e.g. block 106). For example, stream information that is detected in the current boot context may be retained over large periods of time (e.g. not limited to a particular length of time in minutes, hours or days) to be used as pre-boot stream information in subsequent boots. Advantageously, storing the pre-boot stream information may help detect streams on access of the first element of the stream itself thereby identifying the stream earlier (e.g. before the second access request) and making better utilization of the cache (e.g. by avoiding caching information from the first access request). For example, the pre-boot stream information may be stored in a persistent storage device such as a hard disk, a non-volatile memory, or a battery powered memory.

For example, the system power states may include a reduced power state and a shutdown power state. Some processor-based systems utilize a variety of power states including, for example, a ready state, a stand-by state, a suspended state, a hibernation state, and an off state. For example, a hard boot may correspond to a restart of the system from an off state.

Some embodiments of the invention may include saving frequency of stream access information (e.g. block 107) and utilizing the stream frequency information to determine whether to perform the stream access directly to disk or save the stream access in the cache (e.g. block 108). Although contrary to current practices for utilizing a cache, in accordance with some embodiments of the invention there may be advantages to storing relatively large streams in the cache if the stream is accessed relatively frequently. For example, if the cache provides relatively better performance than the mass storage device, the user experience may be enhanced by caching a frequently accessed stream.

In accordance with some embodiments of the invention, a cache may be utilized in accordance with the following pseudo code:

```
Input:
        Access, a request made from the system.
Key Variables:
        N, the number of stream detection slots.
        IsAStream, the number of sectors of streaming data before the start of filtering.
        M, the number of known stream slots.
                // Handle pre-detected case where there is retention of pre-boot stream
information:
LOOP M
    IF KnownStream[M].StartLBA = Access.StartLBA
       && KnownStream[M].RequestSizeThreshold = AVERAGE(Access.RequestSize)
       && KnownStream[M].Operation = Access.Operation THEN
            KnownStream[M].Frequency++
            IF KnownStream[M].Frequency > FREQUENCY_THRESHOLD
               && KnownStream[M].Length < CACHED_STREAM_THRESHOLD THEN
                Pre-fetch(M) OR Send to Disk
                Save stream in Cache
                EXIT
            ENDIF
    ENDIF
END LOOP
                // Detect streams on the fly
LOOP N
        IF Stream[N].ExpectedStartLBA = Access.StartLBA
           && Stream[N].ExpectedRequestSize = AVERAGE(Access.RequestSize)
           && Stream[N].ExpectedOperation = Access.Operation
           && Stream[N].Valid
           && Stream[N].NotEmpty THEN
                Stream[N].ExpectedStartLBA += Stream[N].ExpectedRequestSize
                Stream[N].Length += ExpectedRequestSize
                PlacedInStream = TRUE
                IF Stream[N].Length > IsAStream THEN
                    GOTO Pre-Fetch(N) OR Send To Disk
                Move Stream[N] to Stream[M]
        ENDIF
        ELSE IF Stream[N].NotEmpty THEN
                Stream[N].Expire++
                IF Steam[N].Expire > HighestExpire.Value THEN
                    HighestExpire.Value = Stream[N].Expire
                    HighestExpired.Index = N
                ENDIF
        ENDIF
END LOOP
                // Add new access to available stream slot and let N detect new streams
IF PlacedInStream = FALSE THEN
        IF Stream[ANY N] IS OPEN THEN
                Steam[ANY N].Valid = TRUE
                Steam[ANY N].ExpectedLBA = Access.StartLBA + Access.RequestSize
                Steam[ANY N].ExpectedRequestSize = Access.RequestSize
                Steam[ANY N].ExpectedOperation = Access.Operation
        ELSE
            Place In Stream[HighestExpired.Index]
        ENDIF
ENDIF
```

Advantageously, storing stream information across system power states and/or saving stream frequency information may improve the timing and quality of deciding when and whether to store information in a cache. In some embodiments, making better decisions regarding the utilization of cache memory may make small caches more effective, thereby reducing system size and/or cost. In some embodiments, another advantage is that accesses which are unlikely to be beneficial to the cache may be removed, thereby improving responsiveness of the cache by removing queue traffic, while preserving good media performance from the mass storage device. In some embodiments, caching frequently used streams of certain sizes may provide a better user experience.

Those skilled in the art will appreciate that, given the benefit of the present description, a numerous variety of other circuits and combinations of hardware and/or software may be configured to implement various methods, circuits, and systems in accordance with the embodiments described herein and other embodiments of the invention. The examples of FIGS. 1 through 10 are non-limiting examples of suitable embodiments.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A method of utilizing a cache in an electronic system, comprising:
   locating a cache between a mass storage device and a system memory;
   receiving a first request for mass storage access, the first request requesting first information;
   retrieving pre-boot stream information stored during a previous boot context, the previous boot context being other than a current boot context;
   determining whether the first information is part of a streaming access based on a comparison of first metadata associated with the first request and the pre-boot stream information;
   performing the first request for mass storage access directly with the mass storage device if the first information is determined to be part of the streaming access based on the comparison of the first metadata associated with the first request and the pre-boot stream information;
   comparing frequency information for the streaming access with a frequency threshold;
   performing the first request for mass storage access directly with the mass storage if the first information is determined to be part of the streaming access and the frequency information for the streaming access does not exceed the frequency threshold;
   caching the first information if the first information is determined to be part of the streaming access and the frequency information for the streaming access exceeds the frequency threshold;
   comparing length information for the streaming access with a stream length threshold; and
   preventing the storage of stream data in the cache and sending the stream data directly between the system memory and the mass storage if the length information for the streaming access exceeds the length threshold.

2. The method of claim 1, further comprising caching the first information if the first information is not determined to be part of the streaming access based on the comparison of the first metadata associated with the first request and the pre-boot stream information.

3. The method of claim 2, further comprising:
   receiving a second request for mass storage access, the second request requesting second information;
   if the first information has not previously been determined to be part of the streaming access, determining whether the second information is part of the streaming access based on a comparison of the first metadata associated with the first request and second metadata associated with the second request; and
   if the second information is determined to be part of the streaming access, storing stream information corresponding to the streaming access which is persistent across different power states of the electronic system including a hard boot of the electronic system, wherein the stored stream information can be later used as the pre-boot stream information for subsequent boots.

4. A method of utilizing a cache in an electronic system, comprising:
   locating a cache between a mass storage device and a system memory;
   receiving a first request for mass storage access, the first request requesting first information;
   determining whether the first information is part of a streaming access based on a comparison of first metadata associated with the first request and other information associated with the streaming access;
   if the first information is determined to be part of the streaming access based on the comparison of the first metadata associated with the first request and the other information associated with the streaming access, comparing frequency information for the streaming access with a frequency threshold;
   performing the first request for mass storage access directly with the mass storage device if the first information is determined to be part of the streaming access and the frequency information for the streaming access does not exceed the frequency threshold;
   caching the first information if the first information is determined to be part of the streaming access and the frequency information for the streaming access exceeds the frequency threshold;
   comparing length information for the streaming access with a stream length threshold; and
   preventing the caching of the first information if the length information for the streaming access exceeds the length threshold.

5. The method of claim 4, further comprising:
   updating the frequency information for the streaming access.

6. A method of utilizing a cache in a processor-based system, comprising:
   locating a cache between a mass storage device and a system memory;
   receiving a first request for mass storage access, the first request requesting first information;
   retrieving pre-boot stream information stored during a previous boot context, the previous boot context being other than a current boot context;

determining whether the first information is part of a streaming access based on a comparison of first metadata associated with the first request and the pre-boot stream information;
caching the first information if the first information is not determined to be part of the streaming access based on the comparison of the first metadata associated with the first request and the pre-boot stream information; and
if the first information is determined to be part of the streaming access based on the comparison of the first metadata associated with the first request and the pre-boot stream information:
  comparing frequency information for the streaming access with a frequency threshold;
  performing the first request for mass storage access directly with the mass storage device if the first information is determined to be part of the streaming access and the frequency information for the streaming access does not exceed the frequency threshold;
  caching the first information if the first information is determined to be part of the streaming access and the frequency information for the streaming access exceeds the frequency threshold;
  comparing length information for the streaming access with a stream length threshold; and
  preventing the caching of the first information if the length information for the streaming access exceeds the length threshold.

7. The method of claim 6, further comprising:
receiving a second request for mass storage access, the second request requesting second information;
if the first information has not previously been determined to be part of the streaming access, determining whether the second information is part of the streaming access based on a comparison of first metadata associated with the first request and second metadata associated with the second request; and
if the second information is determined to be part of the streaming access, storing stream information corresponding to the streaming access which is persistent across different power states including a hard boot of the processor-based system, wherein the stream information can be later used as the pre-boot stream information for subsequent boots.

8. The method of claim 6, further comprising:
updating the frequency information for the streaming access.

9. An electronic system, comprising:
a cache located between a mass storage and a system memory for the electronic system; and
code stored on the electronic system to:
prevent storage of stream data in the cache;
send the stream data directly between the system memory and the mass storage based on a comparison of first metadata of a first request for first information and pre-boot stream information stored in a previous boot context of the electronic system;
determine if the first information is part of a streaming access based on the comparison of first metadata associated with the first request and the pre-boot stream information;
compare frequency information for the streaming access with a frequency threshold;
perform the first request for mass storage access directly with the mass storage if the first information is determined to be part of the streaming access and the frequency information for the streaming access does not exceed the frequency threshold;
cache the first information if the first information is determined to be part of the streaming access and the frequency information for the streaming access exceeds the frequency threshold;
compare length information for the streaming access with a stream length threshold; and
prevent the storage of stream data in the cache and to send the stream data directly between the system memory and the mass storage if the length information for the streaming access exceeds the length threshold.

10. The system of claim 9, the code further to:
cache the first information if the first information is not determined to be part of a streaming access based on the comparison of first metadata associated with the first request and the pre-boot stream information.

11. The system of claim 10, the code further to:
receive a second request for mass storage access, the second request to request second information;
if the first information has not previously been determined to be part of the streaming access, determine whether the second information is part of the streaming access based on a comparison of first metadata associated with the first request and second metadata associated with the second request; and
if the second information is determined to be part of the streaming access, store stream information corresponding to the streaming access which is persistent across different power states of the electronic system including a hard boot of the electronic system, wherein the stored stream information can be later used as the pre-boot stream information for subsequent boots.

12. The system of claim 9, the code further to:
update the frequency information for the streaming access.

13. A processor-based system, comprising:
a processor;
a system memory coupled to the processor;
a mass storage device;
a non-volatile cache memory located between the system memory and the mass storage device; and
code stored on the processor-based system to cause the processor-based system to:
receive a first request for mass storage access, the first request to request first information;
retrieve pre-boot stream information stored during a previous boot context of the processor-based system, the previous boot context being other than a current boot context;
determine whether the first information is part of a streaming access based on a comparison of first metadata associated with the first request and the pre-boot stream information;
cache the first information if the first information is not determined be part of the streaming access based on the comparison of first metadata associated with the first request and the pre-boot stream information;
if the first information is determined to be part of the streaming access:
compare frequency information for the streaming access with a frequency threshold;
perform the first request for mass storage access directly with the mass storage device if the first information is determined to be part of the streaming access and the frequency information for the streaming access does not exceed the frequency threshold;

cache the first information if the first information is determined to be part of the streaming access and the frequency information for the streaming access exceeds the frequency threshold;

receive a second request for mass storage access, the second request to request second information;

if the first information has not previously been determined to be part of the streaming access, determine whether the second information is part of the streaming access based on a comparison of the first metadata associated with the first request and second metadata associated with the second request; and if the second information is determined to be part of the streaming access, store stream information corresponding to the streaming access which is persistent across different power states including a hard boot of the processor-based system, wherein the stream information can be later used as the pre-boot stream information for subsequent boots;

compare length information for the streaming access with a stream length threshold; and prevent the storage of stream data in the cache and to send the stream data directly between the system memory and the mass storage device if the length information for the streaming access exceeds the length threshold.

14. The processor-based system of claim 13, the code further to:

update the frequency information for the streaming access.

* * * * *